US007701431B2

(12) United States Patent
Asuma et al.

(10) Patent No.: US 7,701,431 B2
(45) Date of Patent: Apr. 20, 2010

(54) DISPLAY DEVICE WITH DIVIDED DISPLAY REGIONS

(75) Inventors: Hiroaki Asuma, Mobara (JP); Atsushi Hasegawa, Togane (JP)

(73) Assignee: Hitachi, Ltd., Tokyo (JP)

( * ) Notice: Subject to any disclaimer, the term of this patent is extended or adjusted under 35 U.S.C. 154(b) by 955 days.

(21) Appl. No.: 11/396,527

(22) Filed: Apr. 4, 2006

(65) Prior Publication Data

US 2006/0176291 A1 Aug. 10, 2006

Related U.S. Application Data

(62) Division of application No. 09/998,689, filed on Dec. 3, 2001, now abandoned.

(30) Foreign Application Priority Data

Dec. 7, 2000 (JP) ............................ 2000-373171

(51) Int. Cl.

| | |
|---|---|
| ***G09G 3/36*** | (2006.01) |
| ***G09G 5/00*** | (2006.01) |
| ***G06F 3/038*** | (2006.01) |
| ***G06T 1/60*** | (2006.01) |

(52) U.S. Cl. .......................... 345/98; 345/204; 345/530

(58) Field of Classification Search ......... 345/204–206, 345/87, 98–100, 101, 102, 530–574

See application file for complete search history.

(56) References Cited

U.S. PATENT DOCUMENTS

| | | | | |
|---|---|---|---|---|
| 4,842,371 | A | 6/1989 | Yasuda et al. | |
| 5,148,301 | A | 9/1992 | Sawatsubashi | |
| 5,414,442 | A | 5/1995 | Yamazaki | |
| 5,530,266 | A * | 6/1996 | Yonehara et al. | 257/72 |
| 5,742,365 | A | 4/1998 | Seo | |
| 5,844,538 | A | 12/1998 | Shiraki et al. | |
| 5,881,299 | A | 3/1999 | Nomura et al. | |
| 5,907,314 | A | 5/1999 | Negishi et al. | |
| 5,956,105 | A | 9/1999 | Yamazaki | |
| 6,175,351 | B1 * | 1/2001 | Matsuura et al. | 345/98 |
| 6,191,442 | B1 * | 2/2001 | Matsufusa | 257/301 |
| 6,262,703 | B1 * | 7/2001 | Perner | 345/90 |

(Continued)

FOREIGN PATENT DOCUMENTS

| | | |
|---|---|---|
| JP | 7-281201 | 10/1995 |

(Continued)

*Primary Examiner*—Alexander S. Beck
(74) *Attorney, Agent, or Firm*—Antonelli, Terry, Stout & Kraus, LLP.

(57) ABSTRACT

A display device having gate signal lines, a scanning signal driving circuit which supplies scanning signals to respective gate signal lines, drain signal lines, and a video signal driving circuit which supplies video signals to respective drain signal lines formed on one surface of an insulating substrate. The display device includes a first thin film transistor which is driven by the scanning signals, a pixel electrode to which the video signals are supplied through the first thin film transistor in each pixel region. The video signal driving circuit includes a dynamic memory which is comprised of a plurality of other thin film transistors formed in parallel with the first thin film transistor, and at least one thin film transistor among the plurality of other thin film transistors is covered with a conductive film having a potential which is fixed through an insulation film.

4 Claims, 7 Drawing Sheets

U.S. PATENT DOCUMENTS

| | | | |
|---|---|---|---|
| 6,556,265 | B1 | 4/2003 | Murade |
| 6,590,562 | B2 | 7/2003 | Yamazaki et al. |
| 7,023,052 | B2 | 4/2006 | Yamazaki |

FOREIGN PATENT DOCUMENTS

| | | |
|---|---|---|
| JP | 9-146499 | 6/1997 |
| JP | 11-85065 | 3/1999 |
| JP | 11-102172 | 4/1999 |
| JP | 2000-310767 | 11/2000 |
| JP | 2001-075503 | 3/2001 |
| KR | 10-1999-009765 | 2/1999 |
| KR | 10-2000-0056611 | 9/2000 |

* cited by examiner

DISPLAY DEVICE WITH DIVIDED DISPLAY REGIONS

CROSS REFERENCE TO RELATED APPLICATION

This is a divisional of U.S. application Ser. No. 09/998,689, filed Dec. 3, 2001 now abandoned. This application relates to and claims priority from Japanese Patent Application No. 2000-373171, filed on Dec. 7, 2000. The entirety of the contents and subject matter of all of the above is incorporated herein by reference.

BACKGROUND OF THE INVENTION

The present invention relates to a display device, and more particularly, to an active-matrix type liquid crystal display device, in which a liquid crystal display driving circuit is formed on the liquid-crystal-side surface of one of two substrates that are arranged to face each other with liquid crystal being disposed therebetween.

In an active-matrix type display device, pixel regions are defined on a liquid-crystal-side surface of one of two transparent substrates that are arranged to face each other with liquid crystal being disposed therebetween, wherein the pixel regions are surrounded by gate signal lines, which extend in the x direction and are arranged in parallel in the y direction, and drain signal lines, which extend in the y direction and are arranged in parallel in the x direction.

Each pixel region is provided with a thin film transistor which is driven by scanning signals from a gate signal line, on the one hand, and a pixel electrode to which video signals are supplied from a drain signal line, on the other hand, through that thin film transistor. An electric field is generated between the pixel electrode and a counter electrode which is formed opposite it on the liquid-crystal-side surface of the other transparent substrate with an intensity which corresponds to the applied video signal, so as to control the light transmittivity of the liquid crystal.

Further, there is a known liquid crystal display device having the above constitution, which also comprises a scanning signal driving circuit and a video signal driving circuit for respectively supplying signals to respective gate signal lines and respective drain signal lines on the other transparent substrate on the side facing the liquid crystals. Each circuit is comprised of a large number of MIS (Metal-Insulator-Semiconductors) type transistors having a constitution similar to that of the thin film transistors in the pixel regions. These circuits can be formed simultaneously with the formation of the pixels. In this case, polycrystalline silicon (Poly-Si) has been used as semiconductor layers of the thin film transistors and the MIS type transistors.

However, with respect to a display device having the above-described constitution, when the liquid crystal display device is used as a display device of a portable telephone, there is the problem that the power consumption is relatively large.

Further, since a video signal driving circuit uses a dynamic memory, is the problem that a leakage current flows into the thin film transistor which constitutes the dynamic memory.

Further, it has been also pointed out that when the dynamic memory generates photons in a semiconductor layer due to light from the outside, this generation of the photons gives rise to a more adverse influence than the thin film transistor formed inside of the pixel region, for example.

SUMMARY OF THE INVENTION

The present invention has been made in view of such circumstances, and it is an object of the present invention to provide a display device in which the power consumption is minimized.

It is another object of the present invention to provide a display device in which a leakage current which is generated in thin film transistors which constitute a dynamic memory inside of a video signal driving circuit is suppressed.

It is still another object of the present invention to provide a display device in which the dynamic memory in the video signal driving circuit can normally operate.

A brief summary of typical aspects of the invention disclosed in the present application will be set forth as follows.

Aspect 1

A display device is characterized in that gate signal lines which extend in the x direction and are arranged in parallel in the y direction, scanning signal driving circuits which supply scanning signals to respective gate signal lines, drain signal lines which extend in the y direction and are arranged in parallel in the x direction, and video signal driving circuits which supply video signals to respective drain signal lines are formed on the surface of one of two substrates facing the liquid-crystals, which two substrates are arranged to face each other in an opposed manner with the liquid crystal disposed between them. The display device includes a thin film transistor which is driven by scanning signals from one side of the gate signal line, and a pixel electrode to which video signals from one side of the drain signal line are supplied through the thin film transistor in each pixel region which is surrounded by the respective signal lines. A display region, which is a collection of the above pixel regions, is distinguished from the other display regions using imaginary lines extending along the x direction as boundaries.

The scanning signal driving circuit which supplies the scanning signals to respective gate signal lines in one display region and the scanning signal driving circuit which supplies the scanning signals to respective gate signal lines in the other display region are separately formed. The drain signal lines at one display region are separated from the drain signal lines at other display regions, and the video signal driving circuit which supplies the video signals to respective drain signal lines in one display region and the video signal driving circuits which supply the video signals to respective drain signal lines in other display region are separately formed.

In the display device having such a constitution, although one display region and another display region can be used as a single display region, it also is possible to use only either one of these display regions for display. Accordingly, it is unnecessary to supply the scanning signals to the display region which is not used for display, so that the power consumption can be reduced.

Aspect 2

A display device is characterized in that gate signal lines which extend in the x direction and~are arranged in parallel in the y direction, a scanning signal driving circuit which supplies scanning signals to respective gate signal lines, drain signal lines which extend in the y direction and are arranged in parallel in the x direction, and a video signal driving circuit which supplies video signals to respective drain signal lines are formed on the surface of one of two substrates, which are arranged to face each other with liquid crystal inserted between them, facing the liquid crystals. The display device includes a thin film transistor which is driven by scanning signals from one side of the gate signal line and a pixel electrode to which video signals from one side of the drain signal line are supplied through that thin film transistor in each pixel region which is surrounded by the respective signal lines.

The video signal driving circuit includes a dynamic memory which is comprised of a plurality of other thin film transistors formed in parallel with the above-mentioned thin film transistor, and at least one thin film transistor among a plurality of thin film transistors is covered with a conductive film having a potential which is fixedly secured by way of an insulation film.

The display device having such a constitution has an increased capacity in the thin film transistors which constitute the dynamic memory so that the generation of a leakage current can be suppressed.

Aspect 3

A display device is characterized in that it includes a liquid crystal display panel and a backlight which is arranged at the rear of the liquid crystal display panel. It also includes gate signal lines which extend in the x direction and are arranged in parallel in the y direction, a scanning signal driving circuit which supplies scanning signals to respective gate signal lines, drain signal lines which extend in the y direction and are arranged in parallel in the x direction, and a video signal driving circuit which supplies video signals to respective drain signal lines, all of which are formed on the surface of a one of two substrates, which are arranged to face each other in an opposed manner with liquid crystal inserted between them, facing the liquid-crystal.

The display device further includes a thin film transistor which is driven by the scanning signals from one side of the gate signal line and a pixel electrode to which the video signals from one side of the drain signal line is supplied through the thin film transistor in each pixel region which is surrounded by the respective signal lines. The video signal driving circuit includes a dynamic memory which is comprised of a plurality of other thin film transistors formed in parallel with the above-mentioned thin film transistor, and a light shielding film, which prevents the backlight from irradiating the dynamic memory, is formed on the substrate on the side which faces the backlight.

The liquid crystal display device having such a constitution can shield the irradiation of external light to the thin film transistors which constitute the dynamic memory, so that it becomes possible to operate the dynamic memory normally.

Further means and advantageous effects of the present invention will become more apparent from the following description, including the claims.

DESCRIPTION OF THE PREFERRED EMBODIMENTS

Preferred embodiments of a liquid crystal display device according to a present invention will be explained in conjunction with the attached drawings.

<<Overall Constitution>>

Figure 1:
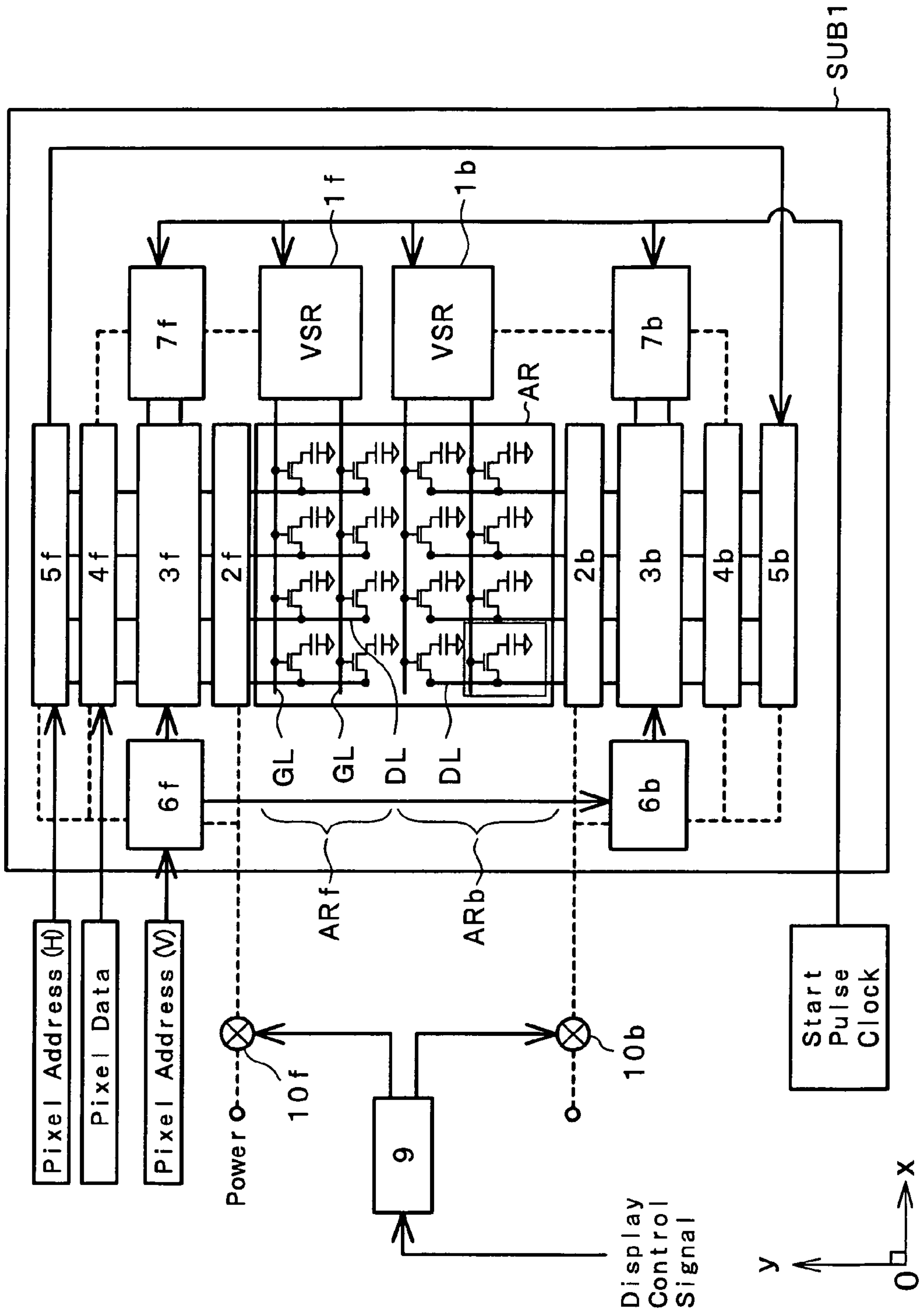
FIG. 1 is an overall schematic circuit diagram showing one embodiment of a liquid crystal display device according to the present invention.

FIG. 1 is a schematic circuit diagram showing one embodiment of a liquid crystal display device according to the present invention. Although the drawing is a circuit diagram, the illustrated arrangement of elements corresponds to the actual geometric arrangement of the display device.

In the drawing, first of all, there is shown a transparent substrate SUB1. The transparent substrate SUB1 is arranged to directly face a transparent substrate SUB2 (not shown in the drawing) with liquid crystal inserted between them. The transparent substrate SUB 2 at least covers the liquid crystal display portion AR and is fixedly secured to the transparent substrate SUB1 using a sealing agent SL, which also forms the periphery of the liquid crystal display portion AR (see FIG. 9).

In the drawing, on the transparent substrate SUB1 on the liquid crystal side, gate signal lines GL, which extend in the x direction and are arranged in parallel in the y direction, and drain signal lines DL, which are insulated from the gate signal lines GL and extend in the y direction while being arranged in parallel in the x direction, are formed. Each rectangular region which is formed by a pair of adjacent gate signal lines GL and a pair of adjacent drain signal lines DL constitutes a pixel region. A collection of these pixel regions, which are arranged in a matrix array, constitutes the liquid crystal display portion AR.

Here, in this embodiment, the respective drain signal lines DL are formed such that they are divided at the center of the liquid crystal display portion AR. That is, the liquid crystal display portion AR is conceptually divided into respective pixel regions which are formed of respective gate signal lines GL ranging from the gate line of the 1st row constituting the uppermost edge to the gate line of the ith row (referred to as "front stage display portion ARf" hereinafter) and respective gate signal lines GL ranging from the gate line of the (i−1)th row line to the lowermost nth row line (referred to as "back stage display portion ARb" hereinafter). The drain signal lines DL which are in control of the front-stage display portion ARf and the drain signal lines DL which are in control of the back-stage display portion ARb are arranged such that they are electrically separated.

In this case, the value of "i" differs depending on the use of the liquid crystal display device and the row "i" may be at the upper stage side with respect to the center of the liquid crystal display portion AR (the center in the y direction in the drawing) or it may be at the lower stage side with respect to the center of the liquid crystal display portion AR.

Then, one side (the right side in the drawing) of the respective gate signal lines GL in the front-stage display portion ARf are connected to a pixel driving shift register 1*f*, which constitutes the scanning signal driving circuit, while the pixel driving shift register if is driven by a start pulse clock signal supplied from outside the liquid crystal display device. Further, one side (the right side in the drawing) of the respective gate signal lines GL in the back-stage display portion Arb are connected to a pixel driving shift register 1*b*, which is provided separately from the above-mentioned pixel driving shift register if, while this pixel driving shift register 1*b* is also driven by the above-mentioned start pulse clock signal.

Further, one side (the upper side in the drawing) of the respective drain signal lines DL in the front-stage display portion ARf are connected to the video signal driving circuit. The video signal driving circuit is comprised of a D-A converting circuit 2*f*, a memory 3*f*, an input data take-in (output) circuit 4*f*, and an H-side address decoder 5*f*, which elements are sequentially arranged in parallel in this order starting from the drain signal line DL, and a V-side address decoder 6*f* and a memory driving shift register 7*f* are connected to the memory 3*f*.

To the H-side address decoder 5*f*, the input data take-in (output) circuit 4*f* and the V-side address decoder 6*f*, a pixel address (H), pixel data and a pixel address (V), which are supplied from outside the liquid crystal display device, are respectively inputted. Further, the memory driving shift register 7*f* is configured to be driven by inputting the above-mentioned start pulse clock signal.

Figure 2:
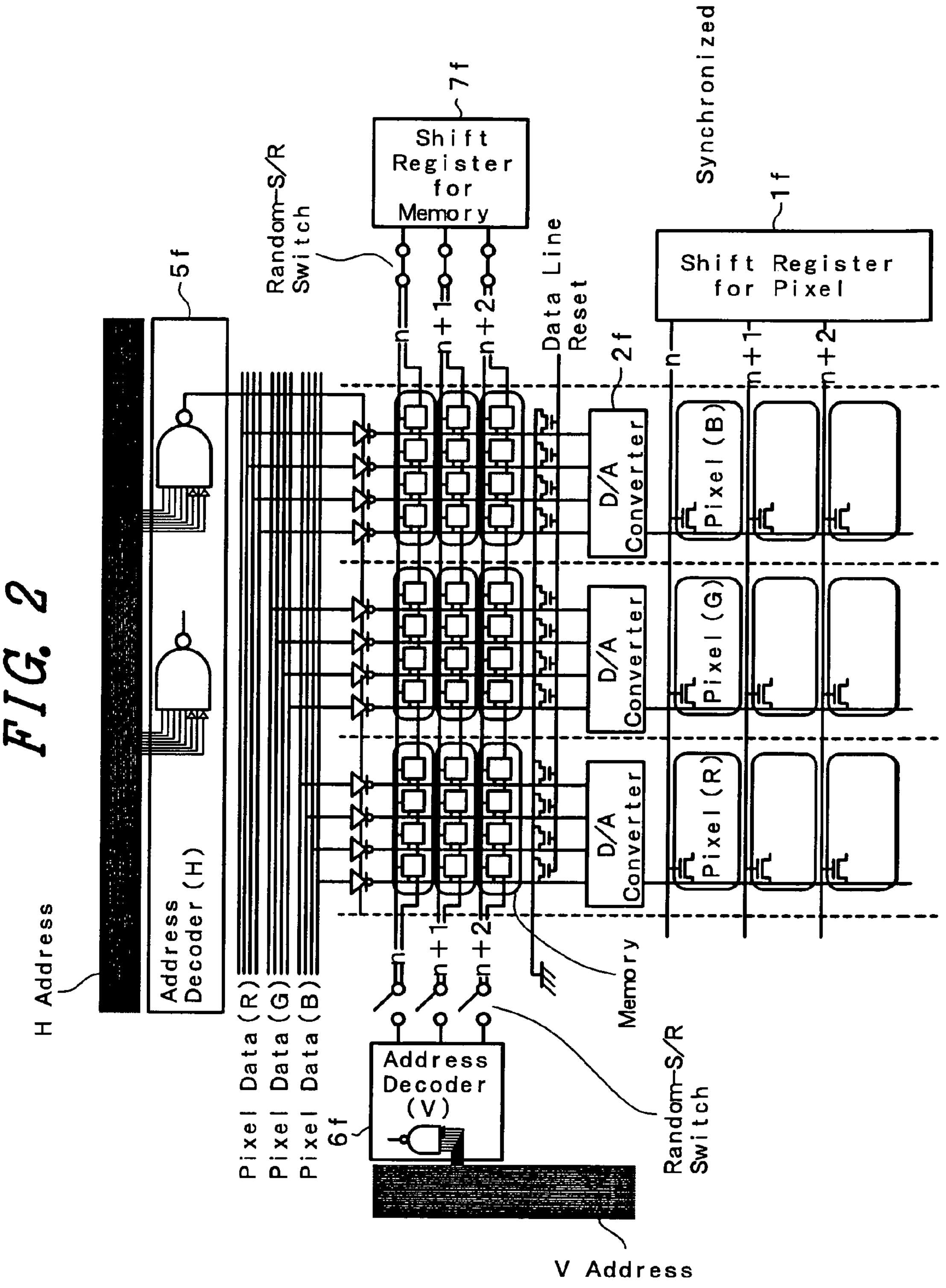
FIG. 2 is a schematic circuit diagram showing one embodiment of a video signal driving circuit of the liquid crystal display device according to the present invention.

A more detailed configuration of such a video signal driving circuit is shown in FIG. 2.

Further, one side (the lower side in the drawing) of the respective gate signal lines GL in the back-stage display portion ARb are connected to a video signal driving circuit, which is provided separately from the above-mentioned video signal driving circuit. This video signal driving circuit is, in the same manner as the above-mentioned video signal driving circuit, comprised of a D-A converting circuit 2*b*, a memory 3*b*, an input data take-in (output) circuit 4*b*, and an H-side address decoder 5*b*, which elements are arranged in parallel in order from the drain signal line DL side, and a V-side address decoder 6*b* and a memory driving shift register 7*b* are connected to the memory 3*b*.

To the H-side address decoder 5*b*, the input data take-in (output) circuit 4*b* and the V-side address decoder 6*b*, a pixel address (H), pixel data and a pixel address (V), which are supplied from outside the liquid crystal display device, are respectively inputted. Further, the memory driving shift register ib is configured to be driven by inputting the above-mentioned start pulse clock signal.

Electric power is supplied to the scanning signal driving circuits and the video signal driving circuits from outside the liquid crystal display device through a power supply control circuit 9, wherein the electric power is supplied to the scanning signal driving circuit and the video signal driving circuit of the front-stage display portion ARf side through a power supply switch I0*f*, while the electric power is supplied to the scanning signal driving circuit and the video signal driving circuit of the back-stage display portion ARb side through a power supply switch 10*b*.

According to the liquid crystal display device having such a constitution, in the liquid crystal display portion AR, while a display can be generated over the whole area, it is possible for the display to be generated only at the front-stage display portion ARf or only at the back-stage display portion ARb.

From the above description, when the liquid crystal display device of this embodiment is used as a liquid crystal display device in a portable telephone, for example, a mode can be used in which information, such as date, time, sensitivity of antenna and the like (information that can be displayed on a portion of the panel), is displayed as images at the front-stage display portion ARf, while the back-stage display portion ARb is not driven.

Accordingly, the liquid crystal display device can be configured to not supply electric power to respective gate signal lines GL of the back-stage display portion ARb, so that a lowering of the power consumption can be effectively enhanced.

<<Constitution of a Pixel>>

Figure 3:
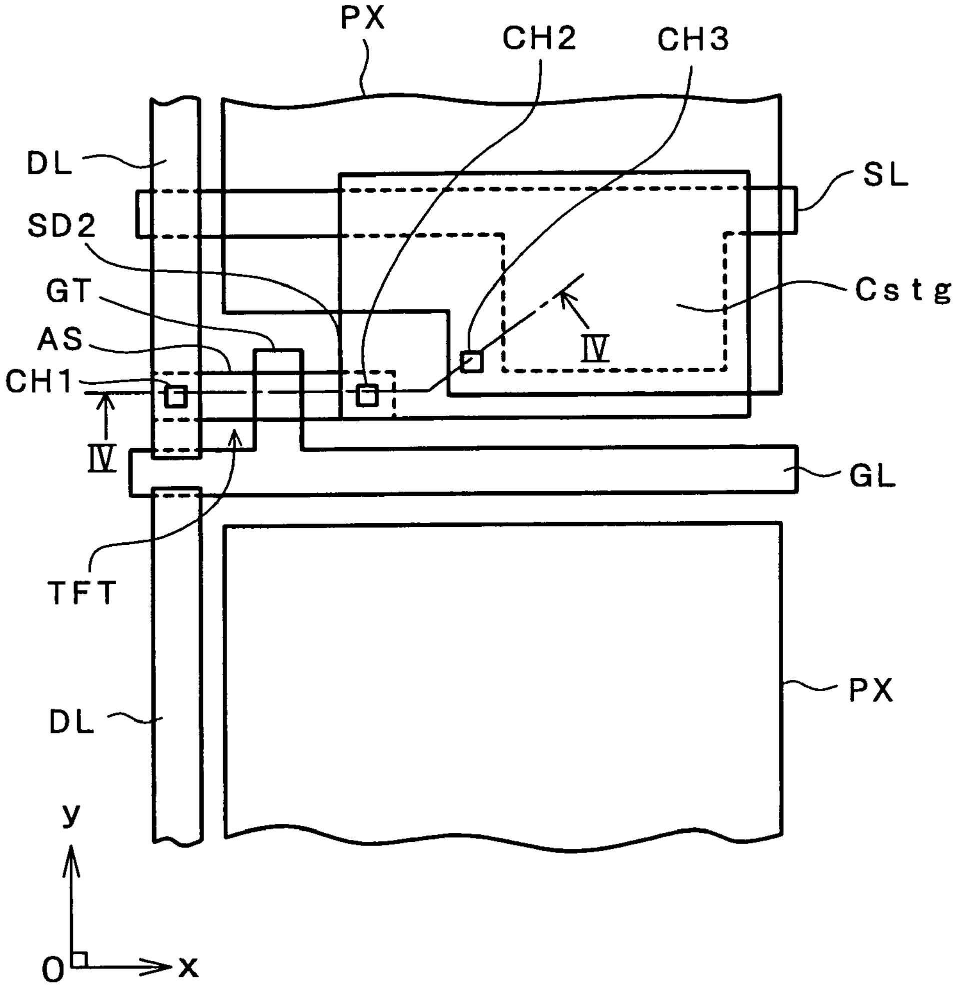
FIG. 3 is a plan view showing one embodiment of a pixel in the liquid crystal display device according to the present invention.
Figure 4:
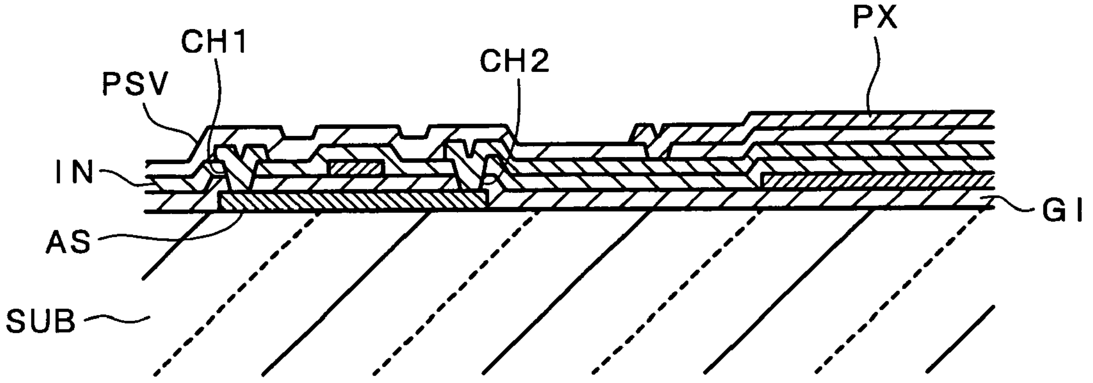
FIG. 4 is a cross-sectional view taken along a line IV-IV in FIG. 3.

FIG. 3 is a plan view which shows one example of a pixel. This drawing particularly shows the pixel at a portion where the drain signal lines DL are separated. That is, the drawing shows a portion of the upper-side pixel and a portion of the lower-side pixel with respect to the gate signal line GL which intersects the drain signal line DL. FIG. 4 is a cross-sectional view taken along a line IV-IV in FIG. 3.

In FIG. 3, first of all, a semiconductor layer AS, which is made of poly-Si, is formed on an upper surface of the transparent substrate SUB1 at a region where a thin film transistor TFT is formed. A first insulation film GI, which is made of $SiO_2$, for example, is formed over the transparent substrate SUB1, such that the first insulation film GI also covers the semiconductor layer AS. This first insulation film GI functions as a gate insulation film in the region where the thin film transistor TFT is formed and functions as a dielectric film in a region where a capacitive element Cstg, which will be explained later, is formed.

The gate signal line GL is formed on the surface of the insulation film GI such that the gate signal line GL extends in the x direction in the drawing. This gate signal line GL is formed such that a portion thereof is extended into the pixel region and is astride the semiconductor layer AS, thus forming a gate electrode GT of the thin film transistor TFT. Further, a storage line SL is formed simultaneously with the formation of the gate signal line GL. The storage line SL is arranged to be substantially parallel to the gate signal line GL and an extension portion having a relatively large area is defined between the storage line SL and the gate signal line GL. This extension portion of the storage line SL is configured to form one of the electrodes of the capacitive element Cstg.

A second insulation film IN, which is, for example, made of $SiO_2$, is formed over the surface of the transparent substrate SUB1 such that the second insulation film IN also covers the gate signal line GL and the storage line SL. This second insulation film IN functions as an interlayer insulation film of the drain signal line DL, which will be explained later with respect to the gate signal line GL, and also functions as a dielectric film in the region where the capacitive element Cstg is formed. Further, contact holes CH1, CH2 are formed in the second insulation film IN such that these contact holes CH1, CH2 penetrate and reach the first insulation film GI, which constitutes the lower layer, so that portions of the drain region and the source region of the thin film transistor TFT are respectively exposed.

Then, the drain signal line DL, which extends in the y direction in the drawing, is formed on the upper surface of the second insulation film IN, and the source electrode SD2 is formed on the upper surface of the second insulation film IN simultaneously with the drain signal line DL.

The drain signal line DL is formed such that the drain signal line DL runs over the contact hole CH1. Due to such a constitution, the drain signal line DL of the contact hole CH1 portion also acts as the drain electrode SD1 of the thin film transistor TFT. Further, the drain signal line DL is separated on the gate signal line GL, wherein a separated end portion of one side of the drain signal line DL and a separated end portion of the other side of the drain signal line DL are both superposed on the gate signal line GL. Such a provision is adopted to prevent the leaking of external light (such as light from the backlight) by providing shielding using the gate signal line GL. In other words, the light shielding of the cut portion of the drain signal line DL is performed by the gate signal line GL.

Further, the source electrode SD2 is formed such that the source electrode SD2 covers the contact hole CH2. The source electrode SD2 is also provided with an extension which is superposed on a portion of the storage line SL and an extension thereof. The extension of the source electrode SD2 constitutes one electrode of the capacitive element Cstg.

Then, a third insulation film PSV, which is made of $SiO_2$, for example, is formed over the transparent substrate SUB such that the third insulation film PSV also covers the drain signal line DL and the source electrode SD2. This third insulation film PSV functions as a protective film which prevents liquid crystal from coming into direct contact with the thin film transistor TFT. Further, a contact hole CH3, which exposes a portion of the extension of the source electrode SD2, is formed in the third insulation film PSV. Still further, a pixel electrode PX, which is made of ITO (indium-tin-oxide), for example, is formed on an upper surface of the third insulation film PSV such that the pixel electrode PX also covers the contact hole CH3.

<<Constitution of the Memory>>

Figure 5:
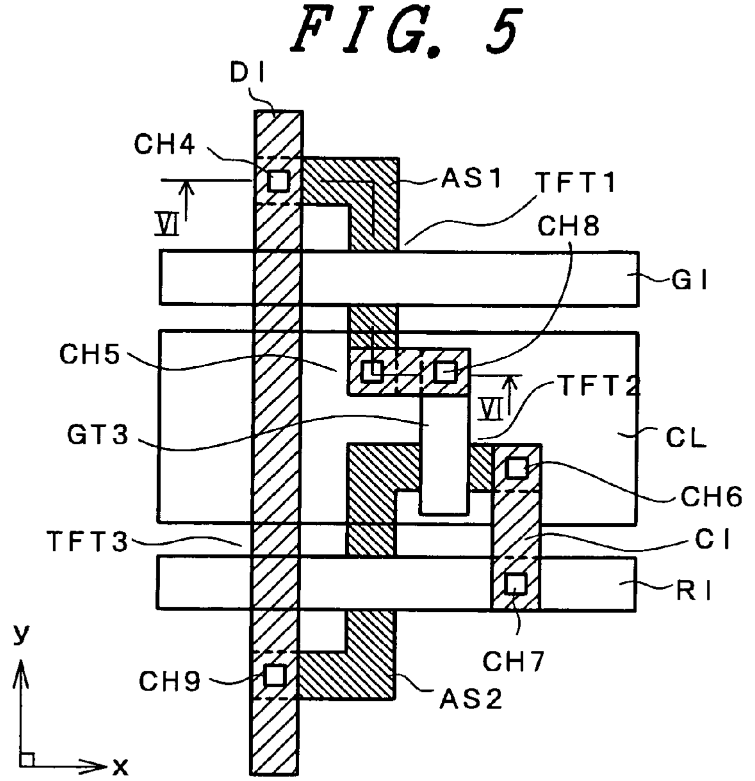
FIG. 5 is a plan view showing one embodiment of a dynamic memory (1 bit) of the liquid crystal display device according to the present invention.
Figure 6:
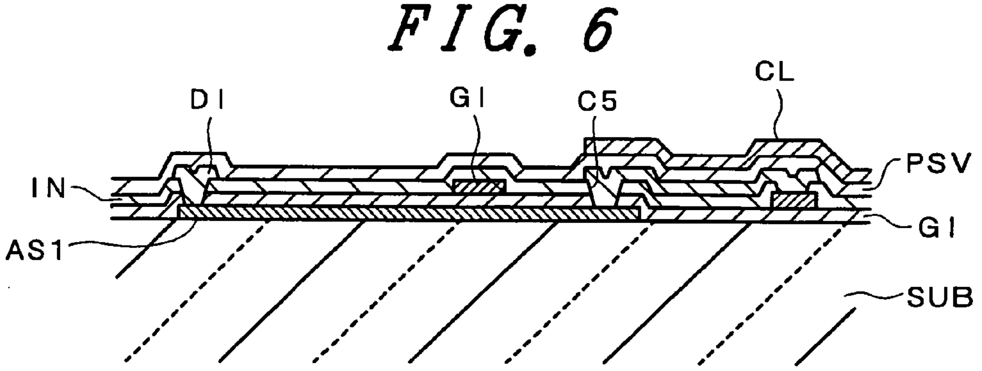
FIG. 6 is a cross-sectional view taken along a line VI-VI in FIG. 5.

FIG. 5 is a plan view showing a portion of the above-mentioned memory shown in FIG. 1 corresponding to 1 bit. Further, FIG. 6 is a cross-sectional view taken along a line VI-VI of FIG. 5.

Figure 7:
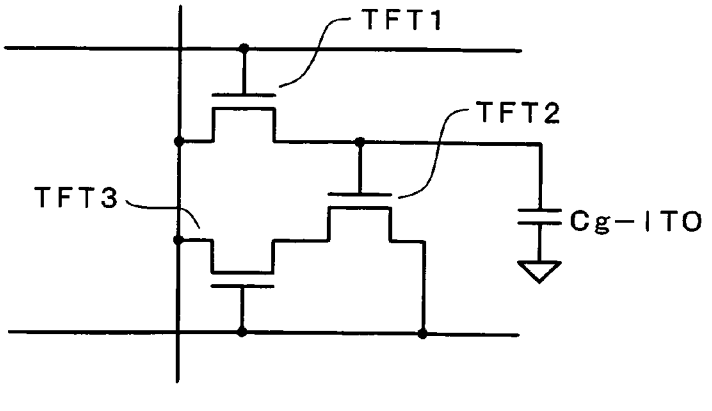
FIG. 7 is a schematic circuit diagram showing one embodiment of a dynamic memory of the liquid crystal display device according to the present invention.

The memory at this portion is a so-called dynamic memory, and schematic circuit diagram thereof is shown in FIG. 7. The constitution shown in FIG. 5 substantially matches the circuit shown in FIG. 7 with respect to the geometric arrangement thereof. The memory shown in FIG. 5 is formed along with the formation of the above-mentioned pixels.

As shown in FIG. 5, first of all, a semiconductor layer $AS_1$ and a semiconductor layer $AS_2$, which are made of poly-Si, are formed on a surface of a transparent substrate SUB1. Among these semiconductor layers, the semiconductor layer $AS_1$ is used as a semiconductor layer which is part of a thin film transistor $TFT_1$ and the semiconductor layer $AS_2$ is used as a semiconductor layer which constitutes a thin film transistor $TFT_2$ and a thin film transistor $TFT_3$. These semiconductor layers $AS_1$, $AS_2$ are simultaneously formed with the formation of the semiconductor layer AS of the thin film transistor TFT in the liquid crystal display portion AR.

Then, a first insulation film GI, which is made of $SiO_2$, is formed on an upper surface of the transparent substrate SUB such that the first insulation film GI also covers these semiconductor layers $AS_1$, $AS_2$. This first insulation film GI functions as gate insulation films of the thin film transistors $TFT_1$ to $TFT_3$.

A gate wiring layer G1 and a refresh wiring layer RI, which extend in the x direction in the drawing, are formed on an upper surface of the first insulation film GI. The gate wiring layer G1 and the refresh wiring layer RI are simultaneously formed with the formation of the gate signal line GL in the liquid crystal display portion AR. In this case, the gate wiring layer G1 is formed such that the gate wiring layer GI transverses a portion of the semiconductor layer $AS_1$, thus forming a gate electrode of the thin film transistor $TFT_1$, while the refresh wiring layer R1 is formed such that the refresh wiring layer R1 transverses a portion of the semiconductor layer $AS_2$ thus forming a gate electrode of the thin film transistor $TFT_3$.

A second insulation layer IN, which is made of $SiO_2$, is formed on the upper surface of the transparent substrate SUB such that the second insulation layer IN also covers the gate wiring layer G1 and the refresh wiring layer RI. The second insulation film IN functions as an interlayer insulation film for the gate wiring layer GI and the refresh wiring layer RI with respect to a drain wiring layer DI, which will be explained later.

Further, a drain region and a source region of the thin film transistor $TFT_1$, a source region of the thin film transistor $TFT_2$, and a drain region and a source region of the thin film transistor $TFT_3$, a portion of the refresh wiring layer R1, and a portion of a gate electrode GT3 are exposed by contact holes CH4, CH5, CH6, CH7, CH8 and CH9 through the second insulation film IN.

The drain wiring layer D1, which extends in the y direction, is formed on an upper surface of the second insulation film IN, and this drain wiring layer DI is connected to the drain region of the thin film transistor $TFT_1$ and the drain region of the thin film transistor $TFT_3$. This drain wiring layer DI is simultaneously formed with the drain signal line DL in the liquid crystal display portion AR.

Further, at this point of time, the gate electrode GT3, which is simultaneously formed with the gate wiring layer G1, is formed such that the gate electrode GT3 transverses the semiconductor layer $AS_2$ of the thin film transistor $TFT_2$. The gate electrode GT3 is connected to the source region of the thin film transistor $TFT_1$. Further, a conductive layer CI, which is simultaneously formed with the drain wiring layer DI, is also formed such that the conductive layer CI establishes the connection between the source region of the thin film transistor $TFT_2$ and the refresh wiring layer R1.

A third insulation film PSV, which is made of $SiO_2$, is formed on the upper surface of the transparent substrate SUB such that the third insulation film PSV also covers the drain wiring layer DI, the gate electrode GT3 and the conductive layer C1. The third insulation film functions as an insulation film for protecting the thin film transistors $TFT_1$ to $TFT_3$.

Then, the conductive layer CL, which is made of an ITO (Indium-Tin-Oxide) film, is formed on an upper surface of the third insulation film PSV. The conductive layer CL is formed simultaneously at the time of forming the pixel electrodes PX in the liquid crystal display portion AR.

In this embodiment, the conductive layer CL is formed such that the conductive layer CL covers the gate region of the thin film transistor $TFT_2$. However, the conductive layer CL is not limited to such a constitution, and the conductive layer CL may be formed such that the conductive layer CL covers the respective gate regions of the other thin film transistors $TFT_1$, $TFT_3$.

Here, the conductive layer CL is held at a fixed potential, such as at ground potential, a power supply potential or the like.

The memory with such a constitution has an increased storage capacity so that it becomes possible to achieve an advantageous effect in that a margin of time beyond that necessary for holding the memory before which there is no leakage of current is generated in the respective thin film transistors $TFT_1$ to $TFT_3$.

<<Explanation of Manner of Operation of the Memory>>

Figure 8A:
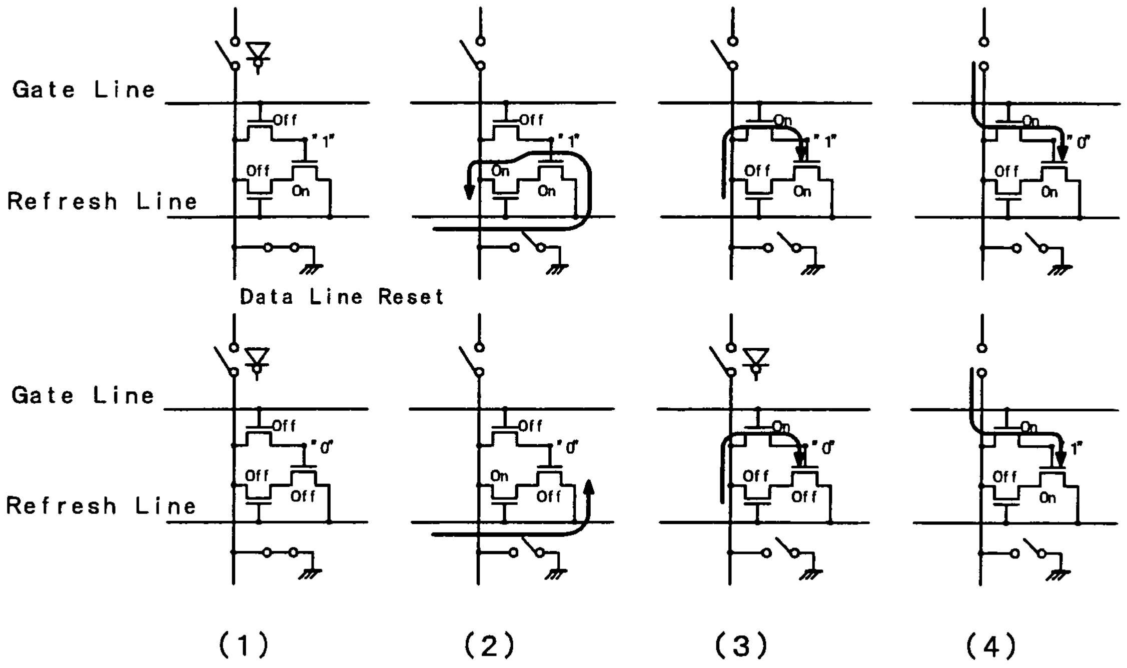
FIG. 8A is a schematic circuit diagram and FIG. 8B is a timing diagram illustrating the operation of the dynamic memory of the liquid crystal display device according to the present invention.
Figure 8B:
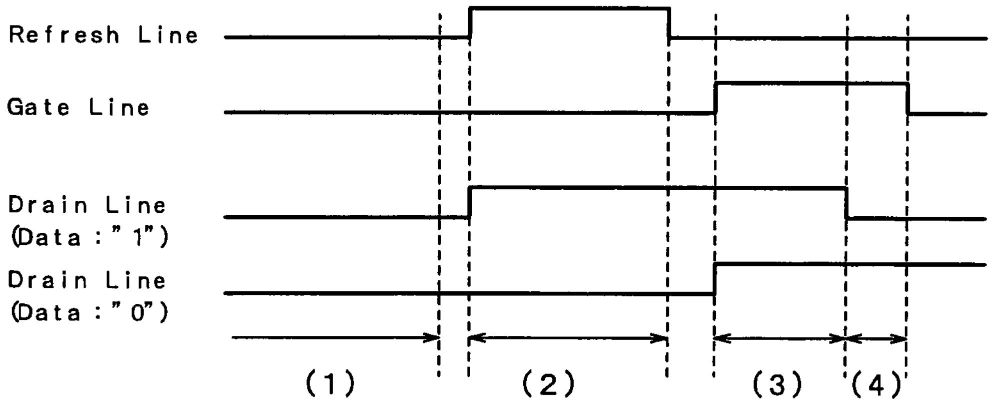

FIG. 8A is a view which shows the manner of operation of the dynamic memory, wherein stage (1) of resetting of data lines (drain wiring layers) to a ground (GND), stage (2) of data reading operation, stage (3) of rewriting of data and stage (4) of writing of new data are respectively indicated by the flow of electric current. Further, FIG. 8B is a timing chart of the respective signals.

<<Liquid Crystal Display Panel>>

Figure 9:
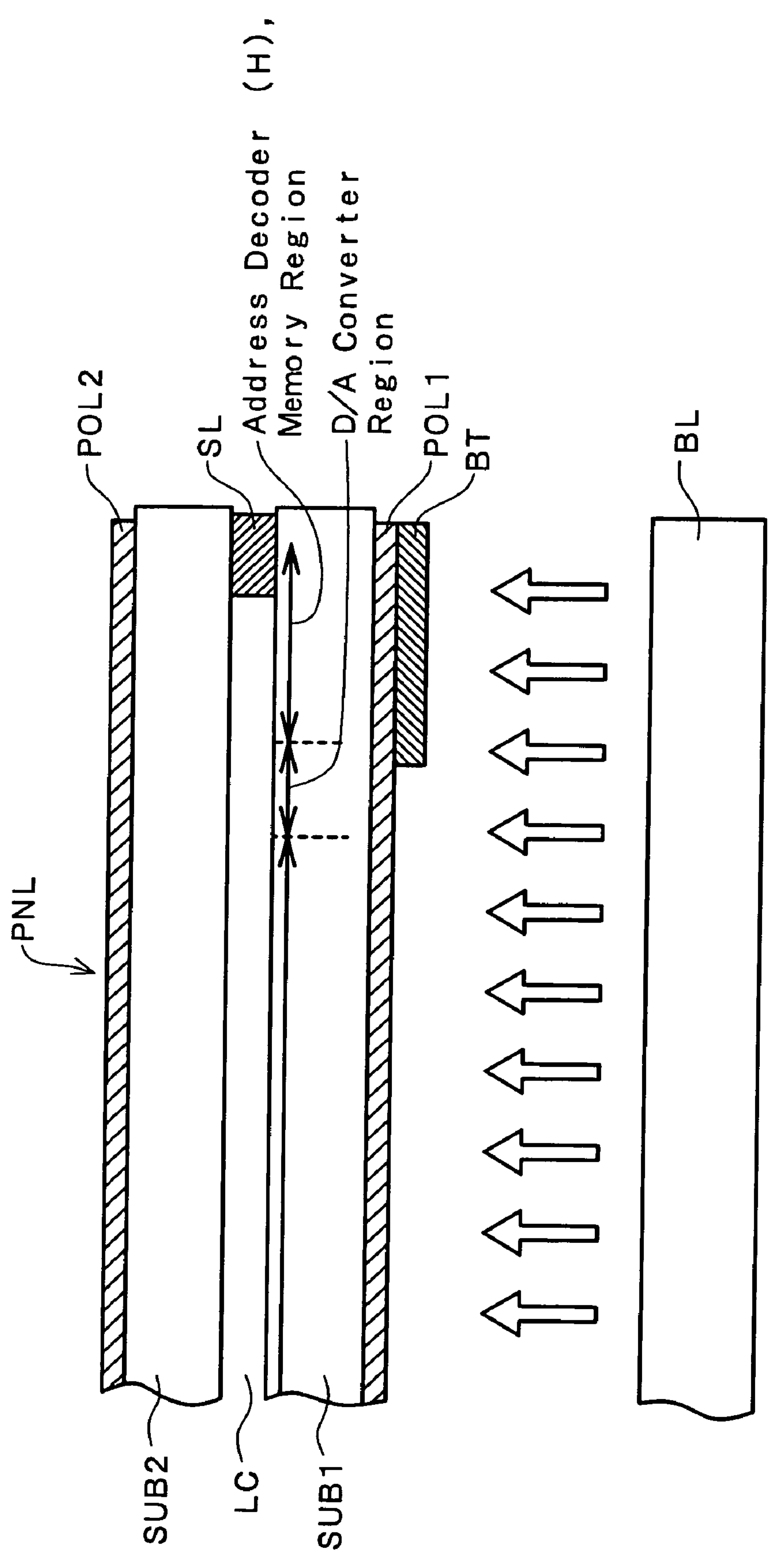
FIG. 9 is a cross-sectional view showing one embodiment of the liquid crystal display panel according to the present invention.

FIG. 9 is a view which shows the relationship between a liquid crystal display panel PNL, which comprises a transparent substrate SUB1 and a substrate SUB2 which are arranged to face each other with liquid crystal LC inserted between them, the substrates acting as an envelope, and a backlight BL, which is arranged at the back surface of the liquid crystal display panel (with respect to an observer).

A polarization film POL2 is formed on the surface of the transparent substrate SUB1 opposite to the liquid crystal, while a polarization film POLI is formed on a surface of the transparent substrate SUB2 opposite to the liquid crystal. The transparent substrate SUB2 is fixedly secured to the transparent substrate SUB1 by a sealing agent SL, which also has a function of sealing the liquid crystal between the transparent substrates SUB1 and SUB2.

Light from the backlight BL is irradiated to an observer through the liquid crystal LC in which the light transmittivity of respective pixels in the liquid crystal display portion AR of the liquid crystal display panel PNL is controlled. In this case, a light shielding film BT is formed on a backlight (BL) side of the transparent substrate SUB1, and this light shielding film BT prevents the light irradiated from the backlight BL from being irradiated to at least the H-side address decoder, the input data take-in (output) circuit and the memory shown in FIG. 1 respectively.

However, it is needless to say that the light shielding film BT may be formed on the whole peripheral region of the liquid crystal display portion AR (region formed of the mass of the pixels), leaving open only the liquid crystal display portion AR.

The liquid crystal display panel PNL, which has such a constitution, can prevent the light from the backlight BL from being irradiated to respective thin film transistors $TFT_1$ to $TFT_3$ which constitute the dynamic memory, so that it becomes possible to obtain an advantageous effect in that the occurrence of erroneous operations can be avoided. That is, when the dynamic memory is used, the adverse influence derived from photons generated in the semiconductors due to the irradiation of light is extremely large. The liquid crystal display panel PNL can overcome such a problem.

In this embodiment, circuits such as the dynamic memory and the like are formed on the liquid-crystal side of the transparent substrate SUB1, which is opposite the backlight BL. However, it is needless to say that these circuits may be formed on the other transparent substrate SUB2. This is because that such a constitution in this case also can prevent the irradiation of the external light to the dynamic memory. A black vinyl film or the like, for example, may be used as the light shielding film BT.

<<Driving Method for the Liquid Crystal Display Panel>>

Figure 10:
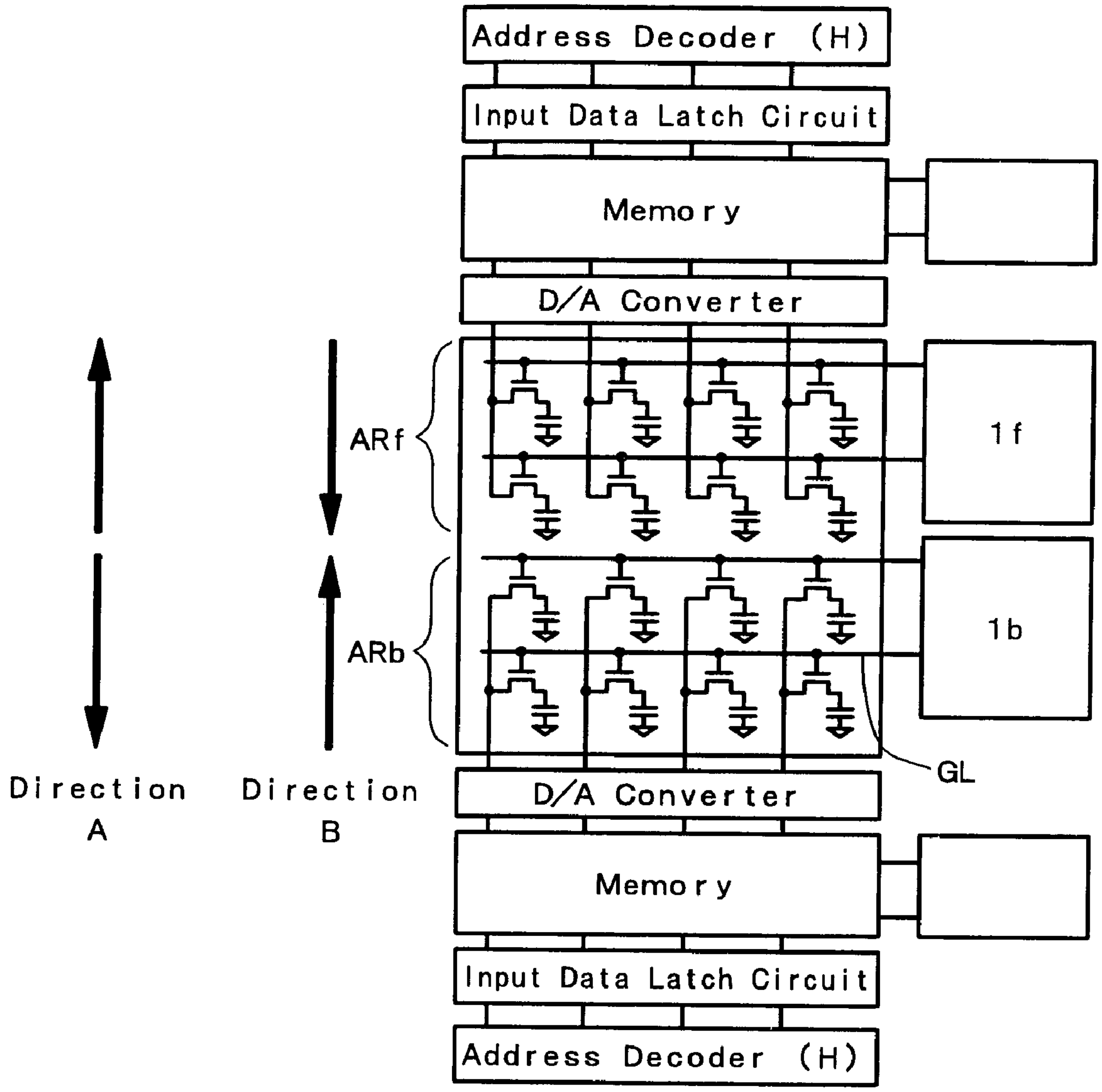
FIG. 10 is a schematic diagram showing one embodiment of a liquid crystal display driving method according to the present invention.

FIG. 10 shows a method of driving the liquid crystal display panel PNL, and more particularly, a driving method using pixel driving shift registers 1*f*, Ib and a method for transmitting video signals from the video signal driving circuit, which becomes necessary along with the method driving the liquid crystal display panel PNL.

As mentioned previously, according to the liquid crystal display device of this embodiment, the liquid crystal display portion AR is divided into a front-stage display portion ARf and a back-stage display portion ARb, and the scanning signals are supplied to the gate signal lines GL through the separate pixel driving shift registers 1*f*, 1*b* respectively.

Then, as an example of such a driving, the scanning signals are supplied to respective gate signal lines GL in the directions (directions A) moving away from the gate signal line GL of the front-stage display portion ARf side and the gate signal line GL of the back-stage display portion ARb side which are present at the boundary of the front-stage display portion ARf and the back-stage display portion ARb.

Further, as another example, as an opposite case, it may be possible that the scanning signals are sequentially supplied to respective gate signal lines GL along directions (directions B) which approach the boundary between the front-stage display part ARf and the back-stage display part ARb. That is, the scanning signals are firstly supplied to the gate signal line GL of the front-stage part ARf side and the gate signal line GL of the back-stage part ARb side, which are disposed remotest from the boundary, and then they are sequentially supplied to other gate signal lines GL of the front-stage part ARf side and other gate signal lines GL of the back-stage part ARb side along the directions B.

With such a constitution, it becomes possible to obtain an advantageous effect in that the display at the boundary between the front-stage display portion ARf and the back-stage display portion ARb becomes extremely natural. That is, with respect to pixels of the front-stage display portion ARf at the boundary and pixels of the back-stage display portion ARb at the boundary, the time difference between their driving can be minimized, so that the leaking of current becoming large at pixels on one side, for example, can be eliminated.

Although the embodiments directed to a liquid crystal display device have been described heretofore, the constitution of the present invention is applicable to other display devices such as an organic EL, an OLED or the like, without departing from the spirit of the present invention.

As can be clearly understood from the above-mentioned description, according to the display device of the present invention, it becomes possible to obtain a display device with low power consumption.

Further, the leakage current which is generated in the thin film transistors which constitute the dynamic memory in the inside of the video signal driving circuit can be suppressed.

Further, it becomes possible to normally operate the dynamic memory inside of the video signal driving circuit.

What is claimed is:

1. A display device being characterized in that gate signal lines which are extended in the x direction and are arranged in parallel in the y direction, a scanning signal driving circuit which supplies scanning signals to respective gate signal lines, drain signal lines which are extended in the y direction and are arranged in parallel in the x direction, and a video signal driving circuit which supplies video signals to respective drain signal lines are formed on one surface of an insulating substrate, the display device includes a first thin film transistor which is driven by the scanning signals from one side of the gate signal line and a pixel electrode to which the video signals from one side of the drain signal line are supplied through the first thin film transistor in each pixel region which is surrounded by the respective signal lines, the video signal driving circuit includes a dynamic memory which is comprised of a plurality of other thin film transistors formed in parallel with the first thin film transistor, wherein each of the plurality of other thin film transistors includes a gate electrode, a first electrode and a second electrode, wherein the plurality of other thin film transistors include a second thin film transistor, a third thin film transistor and a fourth thin film transistor, wherein the first electrode of the second thin film transistor is electrically connected with one of the drain signal lines, wherein the second electrode of the second thin film transistor electrically is connected with the gate electrode of the third thin film transistor, wherein the first electrode of the third thin film transistor is electrically connected with the second electrode of the fourth thin film transistor, wherein the second electrode of the third thin film transistor is electrically connected with the gate electrode of the fourth thin film transistor, wherein the first electrode of the fourth thin film transistor is electrically connected with the one of the drain signal lines, and wherein the third thin film transistor is covered with a conductive film having a potential which is fixed through an insulation film.

2. A display device according to claim 1, wherein the conductive film is formed of material equal to material of the pixel electrodes.

3. A display device according to claim 1, wherein the conductive film covers a gate region of the second thin film transistor.

4. A display device according to claim 1, wherein the conductive film covers a gate region of the fourth thin film transistor.

* * * * *